US011251615B2

(12) United States Patent
Manur et al.

(10) Patent No.: US 11,251,615 B2
(45) Date of Patent: Feb. 15, 2022

(54) CONTROLLER FOR SELF-ORGANIZING MICROGRID

(71) Applicant: Wisconsin Alumni Research Foundation, Madison, WI (US)

(72) Inventors: Ashray Manur, Madison, WI (US); Giri Venkataramanan, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 114 days.

(21) Appl. No.: 16/677,326

(22) Filed: Nov. 7, 2019

(65) Prior Publication Data

US 2021/0143640 A1 May 13, 2021

(51) Int. Cl.
| | |
|---|---|
| *H02J 3/06* | (2006.01) |
| *H02J 3/08* | (2006.01) |
| *H02J 3/28* | (2006.01) |
| *G05B 15/02* | (2006.01) |
| *G05F 1/66* | (2006.01) |

(52) U.S. Cl.
CPC ............... *H02J 3/06* (2013.01); *G05B 15/02* (2013.01); *G05F 1/66* (2013.01); *H02J 3/08* (2013.01); *H02J 3/28* (2013.01)

(58) Field of Classification Search
CPC ........ H02J 3/06; H02J 3/08; H02J 3/28; H02J 3/46; H02J 3/14; H02J 3/381; H02J 2300/28; H02J 2300/24; H02J 13/00004; H02J 13/00017; H02J 2310/12; H02J 3/16; H02J 3/386; H02J 3/383; H02J 13/0093; H02J 3/382; H02J 7/0013; H02J 9/062; H02J 7/0048; G05F 1/66; G05B 15/02; Y02E 10/56; Y02B 70/3225; Y04S 20/222
See application file for complete search history.

(56) References Cited

U.S. PATENT DOCUMENTS

2017/0179723 A1\* 6/2017 Chen ....................... H02J 3/383

\* cited by examiner

*Primary Examiner* — John W Poos
*Assistant Examiner* — Alex W Lam
(74) *Attorney, Agent, or Firm* — Boyle Fredrickson, S.C.

(57) ABSTRACT

A controller for individual sites of the microgrid controls loads, sources, the importing of power, and the exporting of power as a function of the energy storage at the site. A microgrid of such sites provides the benefits of improved energy storage without the need for real-time communication between sites.

15 Claims, 3 Drawing Sheets

CONTROLLER FOR SELF-ORGANIZING MICROGRID

STATEMENT REGARDING FEDERALLY SPONSORED RESEARCH OR DEVELOPMENT

CROSS REFERENCE TO RELATED APPLICATION

BACKGROUND OF THE INVENTION

The present invention relates to electrical power distribution systems and in particular to a controller that can provide self-organizing energy networks without intercommunication between electrically interconnected sites of energy storage, electrical sources, and loads.

Conventional electrical distribution systems provide centralized sources of electrical power, for example, hydroelectric generators or fossil fuel driven turbine generators connected by means of a grid of switches and electrical connections to multiple remote electrical loads in businesses and homes. This model has changed recently with the introduction of distributed electrical sources of electrical power including sources such as solar power, wind power, cogeneration, and the like. Multiple sites of energy objects (energy storage, energy sources, and energy loads) can be advantageously interconnected to form a "microgrid" managed independently of the main grid.

Microgrids provide an important benefit in reducing power distribution costs and power disruptions when the conventional grid fails; however, microgrids by the very nature of their small size can be subject to substantial load and source variations that can undercut reliable delivery of power. To reduce such variations, it is desirable to coordinate the energy objects (energy storage, energy sources, and energy loads) in the microgrid to provide load and supply leveling.

Conventionally, coordinating the energy objects of a microgrid can be provided by a centralized controller that communicates with each of the energy objects to schedule their operation, for example, according to goals such as improving supply reliability and/or reducing energy costs. Configuring such controllers is a complex task involving assigning costs or weights to each of the energy objects and its use, and particularly with respect energy storage, attempting to model or predict future supply and demand.

Centralized control of microgrids requires a reliable communication network to provide real time information on energy production and demand. Unfortunately, practical networks having the necessary reliability are not always available. Even short-term losses of intercommunication between the energy objects and the central controller can have dramatic impacts with respect to the stability of the microgrid.

It is known to coordinate energy sources in a grid without a separate communication network by "droop control." Droop control attempts to deduce the real time balance between energy supply and demand by observing changes in the frequency of distributed AC power, for example, as occurs with a mechanical generator under varying loads. Such droop control has a number of limitations including an inability to handle large disparities between source power and loads and the inability to provide stability on longer timescales.

SUMMARY OF THE INVENTION

The present invention provides a microgrid and more specifically a controller for microgrids that does not require intercommunication between sites of the microgrid. While this would appear to invite substantial instability in the sharing of power between sites, the present inventors have determined through simulation that by making local independent control decisions based on local energy storage, stable global operation across many sites can be obtained.

In one embodiment, the invention provides a controller for use with a site of a microgrid, the site having an energy store and at least one of an energy generator and/or energy load, each controllable by electrical control signals, and a site grid electrically interconnecting the energy store, energy generator, and energy load. The controller provides an energy storage sensor input communicating with the energy store of the site to provide a measure of energy storage by the energy store, and one or more control outputs communicating with the energy generator and energy load to control the same. An electrical circuit stores a control function parameter for each of the energy generator and energy load, and receives the measure of electrical energy storage to generate control signals on the control outputs to each of the energy generator and energy load according to at least one control function being a function of the received measure of energy storage and a corresponding control function parameter, the control signals operating to activate and deactivate the energy generator and energy load from the site grid independent of data from other sites of the microgrid.

It is thus a feature of at least one embodiment of the invention to provide for self-organization of the electrical objects of a site of a microgrid without the reliance on inter-site network communication. By controlling the energy objects based on the current state of energy storage, stable operation can be obtained globally for the microgrid with distributed control.

The control function may be a threshold function and the control parameters may be threshold values denoting a value of the measure of energy storage.

It is thus a feature of at least one embodiment of the invention to provide a flexible and intuitive method of defining a local control algorithm through thresholds applied to measured energy storage.

The site may further include an export circuit connecting the site grid to the microgrid for export of power from the site grid, and the electrical circuit may further hold a control function parameter and a control function for exporting power through the export circuit. The electrical circuit may receive the measure of electrical energy storage to generate a control signal to the export circuit operating to connect and disconnect the site grid to and from the microgrid for the export of power independent of data from other sites of the microgrid.

Similarly, the site of the microgrid further may include an import circuit connecting the site grid to the microgrid for import of power to the site grid and the electrical circuit may further hold a control function parameter and a control function for exporting power through the import circuit and may receive the measure of electrical energy storage to generate a control signal to the import circuit operating to connect and disconnect the site grid to and from the microgrid for the export of power independent of data from other sites of the microgrid.

It is thus a feature of at least one embodiment of the invention to allow the sites of the microgrid to share energy and thus provide improved energy production, storage, and load leveling without site-to-site intercommunication that can be difficult or expensive and subject to failure.

The energy storage sensor input may communicate with multiple energy stores of the site and the measure of electrical energy storage may be a composite of the energy stored in the multiple energy stores.

It is thus a feature of at least one embodiment of the invention to provide a system that can accommodate multiple sources of energy storage, for example, a dedicated battery system and occasional automotive batteries when on-site.

The energy generator or energy load may provide effective energy storage local to the energy generator or energy load, and the effective energy storage may be used together with the measure of energy storage by the energy store to generate the control signals for the corresponding energy generator or one energy load.

It is thus a feature of at least one embodiment of the invention to consider not only stored electrical power, but effective energy storage, for example, in the thermal mass of a refrigerator or heater which can be drawn against without energy consumption for periods of time.

The controller may further include a user input device allowing the electrical circuit to communicate with the user input device for allowing the user to enter the at least one control function parameter.

It is thus a feature of at least one embodiment of the invention provide a system that can be readily programmed by an individual by defining threshold values for each energy object that it controls whether it is active or inactive as a function of stored energy at the site.

The controller may further include a user output device allowing the electrical circuit to communicate with the user output device to provide an indication of historical measures of electrical energy storage.

It is thus a feature of at least one embodiment of the invention to provide feedback to the user, for example, allowing long-term adjustment of threshold levels and energy storage and generation capabilities with respect to energy loads.

The electrical circuit may be centralized at the site to communicate with the at least one of the energy generator and energy load of the site remote from the controller.

It is thus a feature of at least one embodiment of the invention to provide a stand-alone controller that can be readily integrated with pre-existing energy objects.

Invention further contemplates a microgrid comprised of a plurality of sites using this control approach. Each site of the microgrid includes an energy store controllable by an electric control signal, at least one of an energy generator or energy load controllable by electrical control signals, and a site grid electrically interconnecting the energy store, energy generator, and/or energy load. The site may also include a microgrid connection circuit connecting the site grid to the microgrid for export or import of power. The site also provides a controller having: (1) an energy storage sensor input communicating with the energy store of the site to provide a measure of energy storage by the energy store; (2) one or more control outputs communicating with the at least one of the energy generator and energy load to control the same; and (3) an electrical circuit storing a control function parameter for each of the at least one energy generator and energy load and at least one microgrid connection circuit, and receiving the measure of electrical energy storage to generate control signals to each of the at least one of the energy generator and energy load according to at least one control function being a function of the measure of energy storage and corresponding control function parameters, the control signals operating to activate and deactivate the at least one of the energy generator and energy load from the site grid and to connect and disconnect the site grid from the microgrid independent of data from other sites of the microgrid.

It is thus a feature of at least one embodiment of the invention to provide a control system that can be used to coordinate sites of the microgrid without data communication therebetween.

The microgrid may further include a switch for interconnecting the microgrid and a grid according to a switch control signal. In this case, the microgrid may provide a power meter measuring an amount of energy transferred between the microgrid and grid and a grid connection electrical circuit storing a control function parameter for the switch and at least one of an import limit and export limit describing an amount of power to be exported from the microgrid to the grid or imported to the microgrid from the grid. The power meter and grid connection electrical circuit generate the switch control signal according to a control function being a function of a measure of the amount of energy transfer and the control function parameter, the control signal operating to connect and disconnect the site grid from the microgrid independent of data from other sites of the microgrid.

It is thus a feature of at least one embodiment of the invention to provide a mechanism that may optionally connect the microgrid to a standard utility grid while limiting that connection according to grid-imposed rules and/or the economics and reliability impacts of such connection.

These particular objects and advantages may apply to only some embodiments falling within the claims and thus do not define the scope of the invention.

DETAILED DESCRIPTION OF THE PREFERRED EMBODIMENT

Figure 1:
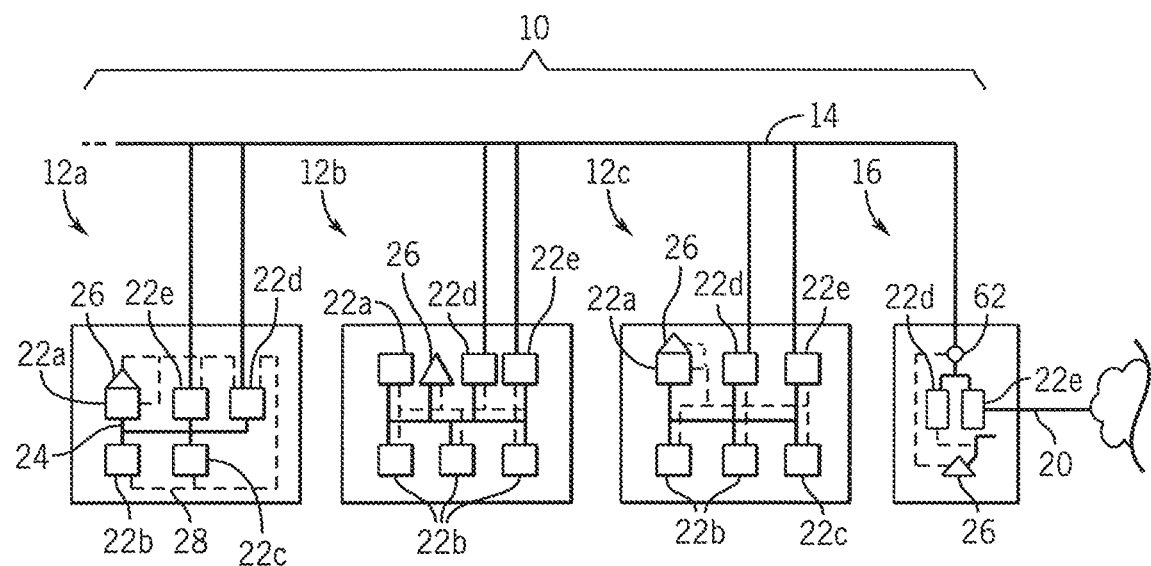
FIG. 1 is a block diagram of a microgrid composed of sites of energy objects, the sites interconnected to form a site grid and having provision for connection to a standard utility grid.

Referring now to FIG. 1, a microgrid system 10 may be comprised of multiple sites 12a-12c interconnected by a microgrid 14 allowing transfer of electrical energy between the sites 12.

In one embodiment, the microgrid 14 may connect with a grid gateway 16 allowing the exchange of power between the microgrid 14 and a standard utility grid 20. The standard utility grid 20 will provide a substantially larger capacity than the microgrid system 10 with respect to absorbing electrical power into the standard utility grid 20 from the microgrid 14 or sourcing electrical power from the standard utility grid 20 to the microgrid 14. For example, the standard utility grid 20 may absorb all of the power from each of the energy sources of the microgrid 14 and may supply the energy needs of each of the loads of the microgrid 14. Despite this large capacity, access to the standard utility grid 20 is normally circumscribed by rules imposed by the owner of the standard utility grid 20 or by cost charges.

Each of the sites 12 may include a variety of energy objects 22, for example, including: energy storage objects 22a, energy load objects 22b, energy source objects 22c, energy export objects 22d, and energy import objects 22e. The energy storage objects 22a may, for example, include stationary sets of electrical batteries, for example, storing electrical energy chemically as well as nonstationary but similar batteries in automobiles or the like. Example energy load objects include standard household and commercial equipment including but not limited to electrical lighting, electrical motors, for example, in heating and refrigeration equipment, electrical heating elements, and a variety electronic circuit including, for example, computer systems and the like. Examples of energy source objects include photovoltaic devices, wind generators, and hydroelectric generators as well as gas generators and the like. The energy export objects 22d and energy import objects 22e may, for example, be electrical switches accompanied by step up or step-down circuitry to inject or extract electrical power from the microgrid 14 as demanded.

Each of these objects 22 is electrically interconnected by a site grid 24 operating in the manner of the microgrid 14 within the site 12. The site grid 24 as well as the microgrid 14 and standard grid 20 will each generally comprise distinct networks of electrical conductors, breakers, and switches necessary to communicate electrical power between a variety of devices or locations. Generally there is no transfer of electrical power between the site grid 24 and the microgrid 14 other than through the export object 22d and import object 22e and no transfer of electrical power between the microgrid 14 and the standard grid 20 except through the grid gateway 16 discussed above.

Figure 2:
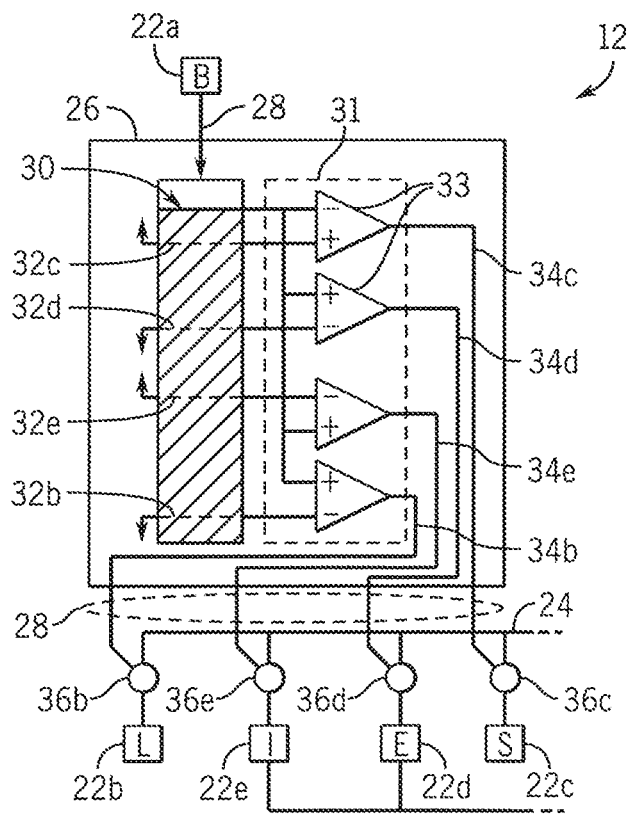
FIG. 2 is a fragmentary detail of one site of FIG. 1 showing a controller communicating with energy objects including sources of energy storage, energy sources, energy loads, and circuits for importing and exporting energy, the controller controlling the energy objects according to functions of energy stored at the site.

Referring now also to FIG. 2, each of the sites 12 may provide for an energy storage server 26 that may communicate via a site control bus 28 with each of the energy objects 22. The energy storage server 26 will develop an energy storage value 30 being a composite of the energy stored in the energy storage objects 22a associated with each site 12, for example, a simple total of these energy amounts either in absolute amount (kilowatt hours) or preferably, and as will be described in detail below, in the form of a percent of total available storage capacity from 0 to 100%. This energy storage value 30 is generated through communication with the energy storage objects 22a and is used to control each of the other energy objects 22b-22e either by forwarding this energy storage value 30 to those objects 22b-22e for local control (in a distributed system) or by using the energy storage value 30 at the energy storage server 26 to deduce control values that will be sent to the other energy objects 22b-22e over the site control bus 28 (in a centralized system).

For clarity, the centralized system will now be described, it being recognized to those of ordinary skill in the art that the function of this centralized system may be readily distributed, for example, to the energy objects 22b-22e according to methods well known in the art and that the invention is thus equally applicable to both architectures.

Referring still to FIG. 2, in the centralized system, the energy storage server 26 stores and presents the energy storage value 30 to an electronic control circuit 31 implementing control functions 33 operating in one embodiment as comparators. The control functions 33 produce output control signals 34 that are functions (in this case, thresholding functions) of the energy storage value 30 and of control parameter 32b-32e associated respectively with individual energy objects 22b-22e. These control parameters 32b-32e may be denominated in units of percent of total energy storage at the site 12 to be directly comparable to the energy storage value 30.

During control of the energy objects 22 of the site 12, the control parameters 32b-32e are repeatedly compared against the energy storage value 30 as it changes and the resulting control signal 34b-34e communicated over the site control bus 28 to the correspondingly labeled energy objects 22b-22e.

At the energy objects 22b-22e, control signals 34b-34e are received by switches 36b-36e which control the connection of the corresponding objects 22b-22e to the site grid 24. The control signals 34b-34e provide a value and logic sense that will either turn the corresponding object 22 on or off as the energy storage value 30 exceeds or drops below the control parameter 32 as will be discussed in more detail below.

While the control functions 33 as discussed above may be a simple thresholding implemented by comparators, it will be appreciated that such an approach can be readily augmented, for example, to not only switching on and off of the energy objects 22 but providing gradiated control of those objects 22, for example, within the range, for example, reducing but not removing power from a load object 22b or reducing but not eliminating power output from a source object 22c. Further the control functions 33 may consider not only the present value of the energy storage value 30 but it's recent history, for example, to provide for hysteresis, or an integration or derivative term commonly used in control systems. Importantly, however, the control function 33 is a function of energy storage value 30 of the particular site 12 and does not require information from other sites 12 such as would necessitate a reliable intercommunication between sites 12.

Figure 3:
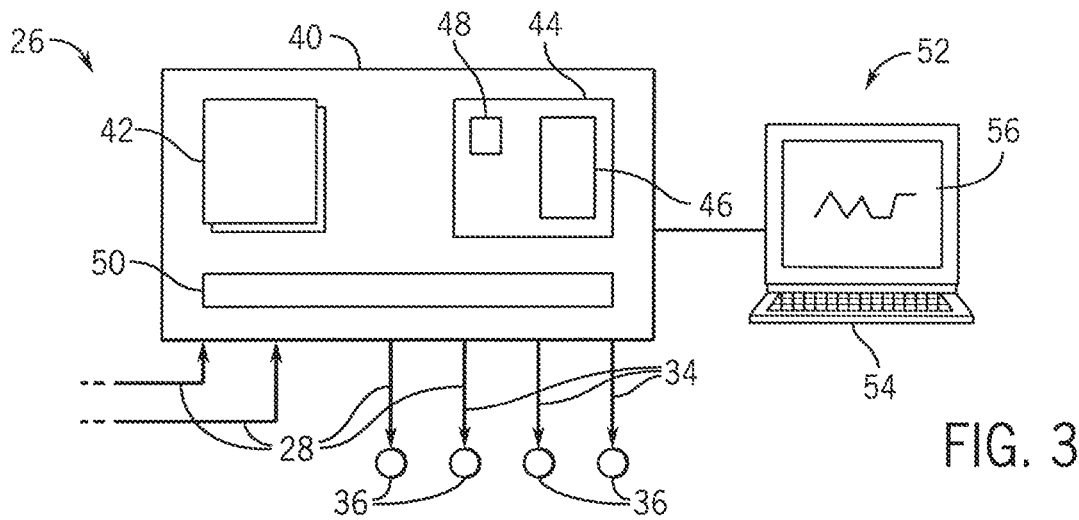
FIG. 3 is an example hardware implementation of the controller FIG. 2.

Referring now to FIG. 3, in one embodiment, the energy storage server 26 may be implemented by an electronic computer 40 having one or more processors 42 communicating with a memory 44. The memory 44 may hold a stored program 46 implementing the control functions 33 as well as data values 48 representing the energy storage value 30, the parameters 32, and values of the control signals 34. The computer 40 may communicate through electrical interface 50 with the site control bus 28 electrical signals providing the control signals 34 to the switches 36 and receiving information over the site control bus 28 allowing generation of the energy storage value 30 from local energy storage objects 22a.

The computer 40 may also provide a user terminal 52 or the like having, for example, a keyboard 54 for the entry of the parameters 32 by a user and providing a display 56, for example, for displaying historical data about energy storage value 30 that allows the user to adjust the number of energy objects 22 and their composition (e.g., as sources, loads, etc.). It will be appreciated that these parameters 32 may alternatively be automatically adjusted based on historical data about energy storage value 30 reflecting trends in power use and that recommendations for changing the mix of energy objects 22 may likewise be automatically generated.

Figure 4:
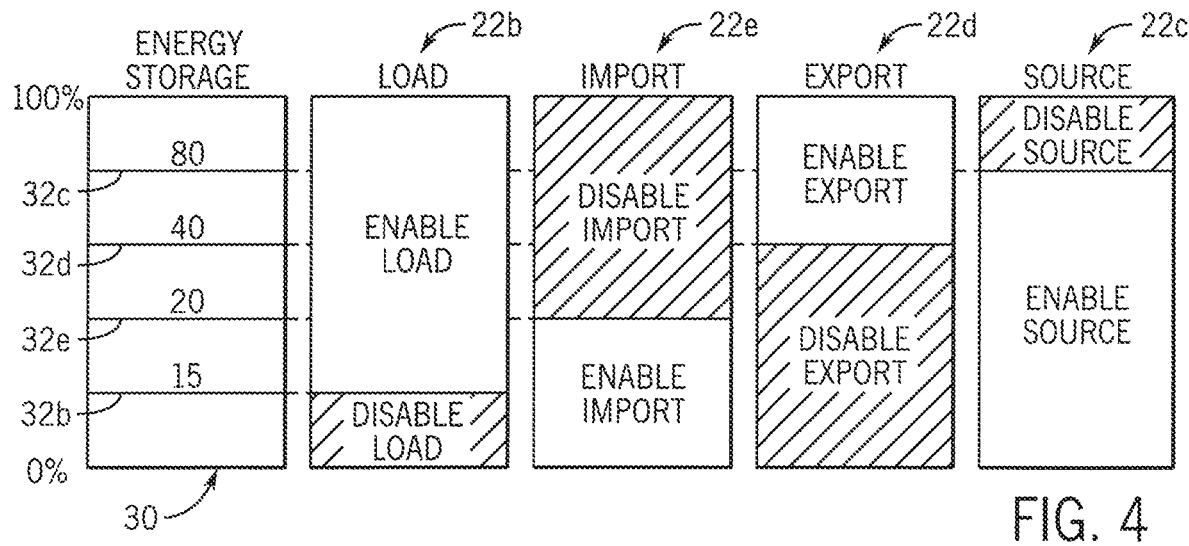
FIG. 4 is a diagrammatic representation of the control process implemented by the controller to provide distributed control of the site energy objects.

Referring now to FIGS. 1 and 4, an illustrative example of the operation of the energy storage server 26 with respect to the energy objects 22 of site 12a of FIG. 1 is provided. In this example, the threshold control parameter 32b for controlling the load object 22b has been set at a low percentage value (e.g., 15%) representing a desire to provide electrical power to the load object 22b as long as possible while holding some reserve power in energy storage object 22a. In this case, the load object 22b would be disabled by the control signal 34 when the energy storage value 30 drops below the threshold of control parameter 32b and activated only when the energy storage value 30 rises above the value of this control parameter 32b.

The parameter 32e for the import object 22e may be set at a higher value, for example, 20%, implementing a strategy of allowing energy importing into the microgrid 14 when the energy storage value 30 drops below that percentage, for example, reflecting a conservative judgment to minimize energy importing when there is adequate storage reserve. Note that the activation and deactivation of the import object 22e generally has the inverted logic sense as that for load object 22b so that the import object 22e is disabled when the energy storage value 30 rises above the value of parameter 32e.

Similarly the export object 22d may have its parameter 32d set to yet a higher value (e.g., 40%) allowing export of power only if the energy stored (indicated by energy storage value 30) is greater than this threshold value. This reflects a desire to have a cushion of stored energy before considering export.

Finally, the control parameter 32c for the energy source object 22c may be set at a relatively high value (e.g., 80%) reflecting a desire to prevent overcharging of the energy storage devices by turning off the source objects 22c when that threshold is approached.

The invention contemplates that these parameters 32 may be easily set by an individual responsible for the site 12, but it will be understood that adjustments to the parameters may be made automatically by observation of the stability of energy storage on a day-to-day basis. Note that the invention contemplates the possibility of communication within a site 12 to set these parameters 32 from a single location and by a single authority who can consider not only objective measures of energy usage but also subjective priorities. Thus, for example, load objects 22b for critical medical functions might be given higher priorities (lower thresholds) than other load objects 22b.

Figure 5:
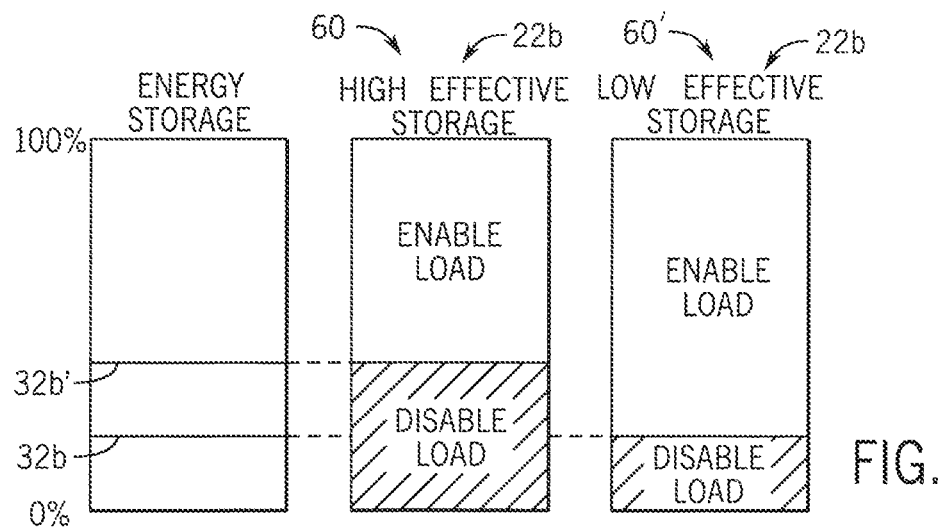
FIG. 5 is a representation similar to that of FIG. 4 for a control process accommodating energy objects having internal energy storage.

Referring now to FIG. 5, some load objects 22b may effectively contain local energy storage that is not readily converted to electrical energy for transport to other energy objects 22. For example, a refrigerator effectively stores energy needed to preserve refrigeration in the thermal mass of its contents and structure. For this reason, a load object 22b of a refrigerator may be disconnected from electrical power for a period of time without loss of function relying on this effective energy storage. Likewise, a heating system, for example, an electrical resistance heater associated with a large thermal store heated by the electrical resistance or associated with auxiliary inputs such as solar power, may have an effective thermal energy storage allowing the load object 22 of the resistance to be disconnected for period of time. These sources of local energy storage (termed "effective energy storage") can be integrated into the control system of the present invention by modifying either the control functions 33, the parameters 32, or the energy storage value 30 for those particular loads objects 22b as a function of this energy storage in the effective energy storage. As an example of using this former control strategy, a first load threshold 32b' may be established for such a load object 22b in a first state 60 when there is high effective energy storage associated with the load object 22b. Alternatively, a second load threshold 32b, lower than the load threshold 32b', may be established when the particular load object 22b is in a second state 60' having low effective energy storage. In this way, the load object 22b may be disabled earlier when there is high effective energy storage allowing it to continue its function once disconnected. Note that these thresholds 32b and 32b' may be discrete values or continuous functions of the effective energy storage.

The value of the effective energy storage associated with a given load object 22b may be determined appropriately depending on the form of energy storage. For example, for thermally stored energy a simple temperature measurement may be made and converted to energy storage based on knowledge about the thermal mass. It will be appreciated that a similar effect may be obtained by adjusting the energy storage value 30 or the function 33 for the load object 22b according to the electrical energy storage at the load object 22b.

Referring again to FIG. 1, the grid gateway 16 may be incorporated into the control structure described above through the use of a power meter 62 measuring the transfer of power between the microgrid 14 and the standard utility grid 20. The reading of the power meter 62 may be integrated to provide a tally of total energy transfer to create a virtual energy storage object 22a' providing a virtual energy storage value 30. Thus, for example, if the utility operating the standard utility grid 20 provides for a maximum exporting of electrical power for each day, the virtual energy store may indicate an energy storage value 30 of 100% energy storage before any electrical power is exported to the standard utility grid 20 and an energy storage value 30 of 0% when the maximum allowable power is exported. It will be appreciated that instead of an energy limit (kilowatt hours per day), a power limit (kilowatts) may be measured and used to control the grid gateway 16. The power and energy may be approximated by a measurement of amperage or may consider both amperage and voltage. Alternatively or in addition, the power or energy limits can be reactive power or energy limits. Likewise the utility operating the standard utility grid 20 may place a cap on the amount of imported electrical power, for example, a given number of kilowatt hours per day. In this case, before any power is imported to the microgrid 14 for a given day, virtual energy storage may provide an energy storage value 30 of 100%, and when the cap is reached an energy storage value 30 of 0%. These energy storage values 30 may be used with set parameters 32 and control functions 33 associated with the grid gateway 16 to be used for control of the grid gateway 16 import or export objects 22e or 22d in the grid gateway 16, control in the matter discussed with respect to FIG. 2 by a local energy storage server 26.

Figure 6:
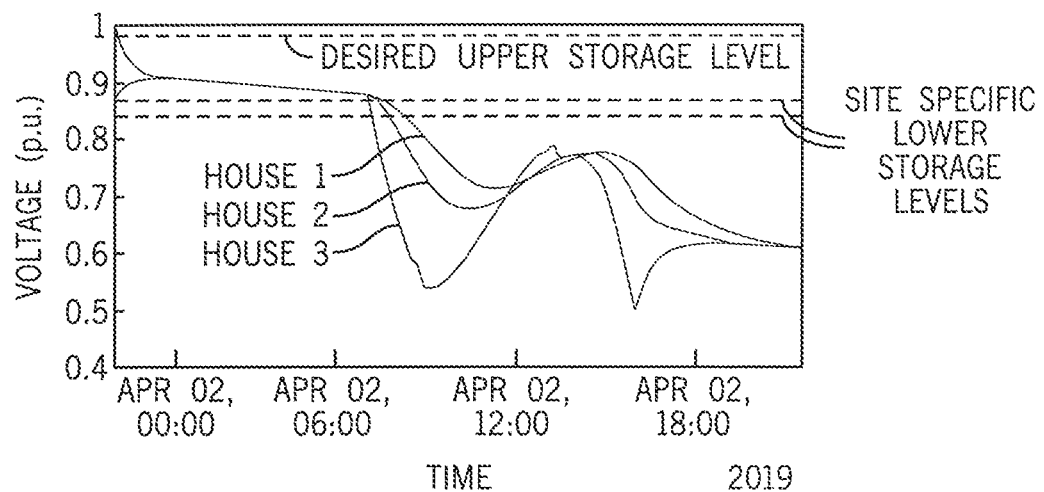
FIG. 6 is a plot of one simulation performed by the present inventors showing energy storage fluctuations at a simple site without the present invention.
Figure 7:
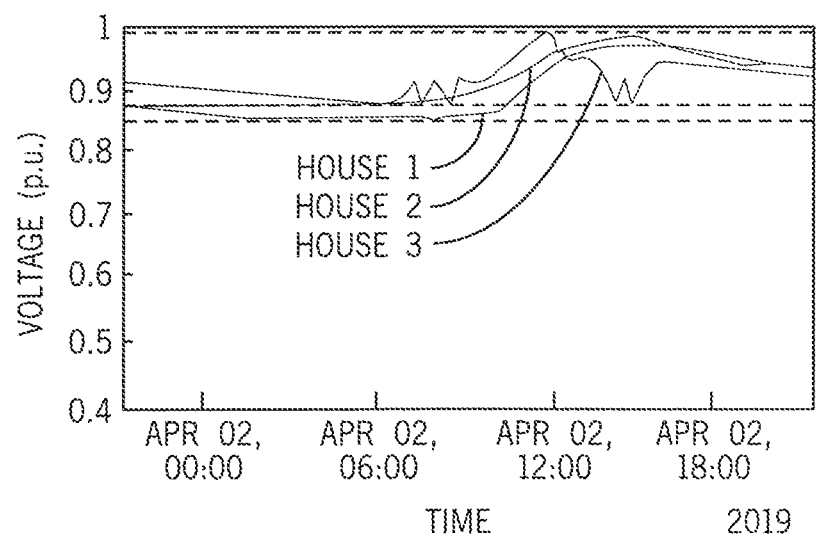
FIG. 7 is a plot similar to that of FIG. 6 showing energy storage variations with implementation of the present invention.

Referring now to FIGS. 6 and 7, the ability of each site 12 to control its energy object 22 independently and without knowledge of the other sites 12 while improving load and source stability has been established by the present inventors through numerous simulations. In one basic simulation, three "houses" represent different sites 12 on a microgrid provide varying electrical demand and electrical supply during the day per FIG. 6 by plot lines indicating battery voltage variations (vertical axis) corresponding to energy storage at the site 12 during different times of the day (horizontal axis) per simulated varying energy source availability and energy load demand. It can be seen that the plot lines in FIG. 6 fall below desired site energy storage levels for each of the sites 12. In contrast, in referring to FIG. 7, when the sites are controlled according to the present invention, the same simulated energy source availability and energy load demand preserves an energy storage amount above the desired site energy storage levels for each site 12 yet without coordination between the sites 12 such as would require a reliable inter-site network.

Certain terminology is used herein for purposes of reference only, and thus is not intended to be limiting. For example, terms such as "upper," "lower," "above," and "below," refer to directions in the drawings to which reference is made. Terms such as "front," "back," "rear," "bottom," and "side," describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first," "second," and other such numerical terms referring to structures do not imply a sequence or order unless clearly indicated by the context. Although the stator and rotors are shown as disks in the disclosed embodiments, there is no requirement that the stator or rotor be in a disk form.

When introducing elements or features of the present disclosure and the exemplary embodiments, the articles "a," "an," "the," and "said," are intended to mean that there are one or more of such elements or features. The terms "comprising", "including," and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What we claim is:

1. A controller for use with a site of a microgrid, the site having an energy store and at least one of an energy generator and energy load, each controllable by electrical control signals, and a site grid electrically interconnecting the energy store and the at least one of the energy generator and energy load, the controller comprising:
    an energy storage sensor input communicating with the energy store of the site to provide a measure of energy storage by the energy store;
    one or more control outputs communicating with the at least one of the energy generator and energy load to control the same; and
    an electrical circuit storing a control function parameter for each of the at least one energy generator and energy load, and receiving the measure of electrical energy storage to generate control signals on the control outputs to each of the at least one of the energy generator and energy load according to at least one control function being a function of the received measure of energy storage and a corresponding control function parameter, the control signals operating to activate and deactivate the at least one of the energy generator and energy load from the site grid independent of data from other sites of the microgrid; and
    wherein the electrical circuit is an electronic computer executing a program held in non-transitory memory and communicating with an interface for communicating control signals to external devices.

2. The controller of claim 1 wherein the site includes at least one of each of an energy generator and an energy load and wherein the site grid connects each of the at least one of an energy generator and energy load.

3. The controller of claim 1 wherein the at least one control function is a threshold function, and the control parameters are threshold values denoting a value of the measure of energy storage.

4. A controller for use with a site of a microgrid, the site having an energy store and at least one of an energy generator and energy load, each controllable by electrical control signals, and a site grid electrically interconnecting the energy store and the at least one of the energy generator and energy load, the controller comprising;
    an energy storage sensor input communicating with the energy store of the site to provide a measure of energy storage by the energy store,
    one or more control outputs communicating with the at least one of the energy generator and energy load to control the same; and
    an electrical circuit storing a control function parameter for each of the at least one energy generator and energy load, and receiving the measure of electrical energy storage to generate control signals on the control outputs to each of the at least one of the energy generator and energy load according to at least one control function being a function of the received measure of energy storage and a corresponding control function parameter, the control signals operating to activate and deactivate the at least one of the energy generator and energy load from the site grid independent of data from other sites of the microgrid; and wherein the site of the microgrid further includes an export circuit connecting the site grid to the microgrid for export of power from the site grid and wherein the electrical circuit further holds a control function parameter and a control function for exporting power through the export circuit and receives the measure of electrical energy storage to generate a control signal to the export circuit operating to connect and disconnect the site grid to and from the microgrid for the export of power independent of data from other sites of the microgrid.

5. The controller of claim 4 wherein the site of the microgrid further includes an import circuit connecting the site grid to the microgrid for import of power to the site grid and wherein the electrical circuit further holds a control, function parameter and a control function for exporting power through the import circuit and receives the measure of electrical energy storage to generate a control signal to the import circuit operating to connect and disconnect the site grid to and from the microgrid for the export of power independent of data from other sites of the microgrid.

6. A controller for use with a site of a microgrid, the site having an energy store and at least one of an energy generator and energy load, each controllable by electrical control signals, and a site grid electrically interconnecting the energy store and the at least one of the energy generator and energy load, the controller comprising:

an energy storage sensor input communicating with the energy store of the site to provide a measure of energy storage by the energy store;

one or more control outputs communicating with the at least one of the energy generator and energy load to control he same; and an electrical circuit storing a control function parameter for each of the at least one energy generator and energy load, and receiving the measure of electrical energy storage to generate control signals on the control outputs to each of the at least one of the energy generator and energy load according to at least one control function being a function of the received measure of energy storage and a corresponding control function parameter, the control signals operating to activate and deactivate the at least one of the energy generator and energy load from the site grid independent of data from other sites of the microgrid; and wherein the energy storage sensor input communicates with multiple energy stores of the site and wherein the measure of electrical energy storage is a composite of the energy stored in the multiple energy stores.

7. The controller of claim 1 wherein at least one energy generator or at least one energy load provides effective energy storage local to the at least one energy generator or energy load and wherein the effective energy storage is used together with the measure of energy storage by the energy store to generate the control signals for the corresponding at least one energy generator or at least one energy load.

8. The controller of claim 1 further including a user input device wherein the electrical circuit communicates with the user input device for allowing the user to enter the at least one control function parameter.

9. The controller of claim 1 further including a user output device and wherein the electrical circuit communicates with the user output device to provide an indication of historical measures of electrical energy storage.

10. The controller of claim 1 wherein the electrical circuit is centralized at the site to communicate with the at least one of the energy generator and energy load of the site remote from the controller.

11. The controller of claim 1 including at least one energy generator selected from the group consisting of: photovoltaic devices, wind generators, and hydroelectric generators.

12. The controller of claim 1 including at least one energy store selected from the group consisting of standalone electrical batteries and electric vehicle batteries.

13. The controller of claim 1 including at least one energy load selected from the group consisting of: an electrical light, and electrical motor, an electrical heating element, and an electronic circuit.

14. A microgrid system comprising a plurality of sites, each site having an energy store controllable by an electric control signal;

at least one of an energy generator and energy load controllable by electrical control signals;

a site grid electrically interconnecting the energy store and the at least one of the energy generator and energy load;

at least one microgrid connection circuit connecting the site grid to the microgrid for export or import of power; and a controller providing:

(1) an energy storage sensor input communicating with the energy store of the site to provide a measure of energy storage by the energy store;

(2) one or more control outputs communicating with the at least one of the energy generator and energy load to control the same; and (3) an electrical circuit storing a control function parameter for each of the at least one energy generator and energy load and at least one microgrid connection circuit, and receiving the measure of electrical energy storage to generate control signals to each of the at least one of the energy generator and energy load according to at least one control function being a function of the measure of energy storage and a corresponding control function parameter, the control signals operating to activate and deactivate the at least one of the energy generator and energy load from the site grid and to connect and disconnect the site grid from the microgrid independent of data from other sites of the microgrid; and further including a grid connection circuit providing:

a switch for interconnecting the microgrid and grid according to a switch control signal;

a power meter sensor measuring an amount of energy electricity transferred between the microgrid and grid to provide a transfer measurement signal; and a grid connection electrical circuit storing a control function parameter for the switch and at least one of an import limit and export limit describing an amount of power limitations on electricity to be exported from the microgrid to the grid or imported to the microgrid from the grid to generate the switch control signal according to a control function being a function of a measure of the amount of energy transfer the transfer measurement signal and the control function parameter, the control signal operating to connect and disconnect the site grid from the microgrid independent of data from other sites of the microgrid.

15. The microgrid of claim 14 wherein the transfer measurement signal measures at least one of electrical power, electrical energy, reactive power, and reactive energy.

* * * * *